United States Patent [19]

Adams et al.

[11] Patent Number: 5,761,424

[45] Date of Patent: Jun. 2, 1998

[54] METHOD AND APPARATUS FOR PROGRAMMABLE FILTRATION AND GENERATION OF INFORMATION IN PACKETIZED COMMUNICATION SYSTEMS

[75] Inventors: John M. Adams; Timothy E. Hoglund; Stephen M. Johnson; Mark A. Reber. all of Colorado Springs; David M. Weber. Monument. all of Colo.

[73] Assignee: Symbios, Inc., Fort Collins, Colo.

[21] Appl. No.: 580,955

[22] Filed: Dec. 29, 1995

[51] Int. Cl.$^6$ ............................................. G06F 15/16
[52] U.S. Cl. .......................... 395/200.47; 395/200.48; 370/428
[58] Field of Search ................... 395/200.47, 200.48, 395/200.5, 200.51, 200.53, 200.62, 200.68; 370/428, 501, 902, 906, 126

[56] References Cited

U.S. PATENT DOCUMENTS

| | | | |
|---|---|---|---|
| 4,899,383 | 2/1990 | Einolf, Jr. et al. | 380/48 |
| 4,908,823 | 3/1990 | Haagens et al. | 370/464 |
| 4,979,095 | 12/1990 | Ghaffari | 364/286 |
| 5,067,104 | 11/1991 | Krishnakumar et al. | 395/567 |
| 5,151,935 | 9/1992 | Slife et al. | 379/240 |
| 5,184,348 | 2/1993 | Abdelmouttalib et al. | 370/431 |
| 5,301,303 | 4/1994 | Abraham et al. | 395/500 |
| 5,390,041 | 2/1995 | Knecht et al. | 359/158 |
| 5,390,183 | 2/1995 | Friedrich et al. | 370/249 |
| 5,412,653 | 5/1995 | Hoppe et al. | 370/360 |
| 5,463,777 | 10/1995 | Bialkowski et al. | 395/613 |
| 5,530,703 | 6/1996 | Liu et al. | 370/255 |
| 5,541,911 | 7/1996 | Nilakantan et al. | 370/422 |
| 5,574,910 | 11/1996 | Bialkowski et al. | 395/601 |
| 5,608,662 | 3/1997 | Large et al. | 364/724.011 |
| 5,627,829 | 5/1997 | Gleeson et al. | 370/230 |
| 5,648,965 | 7/1997 | Thadani et al. | 370/241 |
| 5,654,886 | 8/1997 | Zereski, Jr. et al. | 364/420 |

*Primary Examiner*—Parshotam S. Lall
*Assistant Examiner*—Zarni Maung
*Attorney, Agent, or Firm*—Daniel N. Fishman; Wayne P. Bailey

[57] ABSTRACT

A method and associated apparatus for automating the filtration and generation of information in a packetized communication system. A filtration table includes entries used in recognizing a valid packet received at a node in a communication system. A mask field in each entry is applied to appropriate fields in the packet (e.g. the ordered set as applied to Fibre Channel communication systems) to determine the validity of the packet with regard to the receiving node. Rules in a field of each entry further qualify the recognition of a received packet (e.g. ordered set) by testing the reception of the packet against other logical rules. Action fields in each record permit definition of actions to be invoked automatically (e.g. automatic adjustment of fill transmissions in Fibre Channel applications) in response to receipt and recognition of a particular packet. The set of packets recognized by the receiving node may be modified by adding, deleting, or modifying the entries in the filtration table. The programmable filtration thereby permits simple modifications to the protocol supported by the receiving node. Programmable generation capabilities of the present invention permit rapid integration of additional packets (e.g. ordered sets) transmitted in response to perceived packets in the receiving node. Programmable parameters in the receiving node permit automatic generation and transmission of packets in accordance with the parameter settings at the time of packet transmission.

27 Claims, 4 Drawing Sheets

METHOD AND APPARATUS FOR PROGRAMMABLE FILTRATION AND GENERATION OF INFORMATION IN PACKETIZED COMMUNICATION SYSTEMS

BACKGROUND OF THE INVENTION

1. Field of the Invention

The present invention relates to processing of information in a packetized communication system. In particular, the present invention relates to methods and apparatus for filtering and generating packets in a flexible, programmable manner.

2. Background of the Invention

In packetized communication systems, information is exchanged between nodes in units referred to as packets. It is common in such communication systems that a beginning portion of the packet (also referred to as a header) identifies attributes of the packet. Such attributes may include, for example, addressing information that identifies the destination of the packet in multi-point or loop topology communication systems, or type information identifying the type of packet being transmitted.

A receiving node typically parses information in the packet (from the header for example) to determine if the packet is relevant to the particular receiving node. A packet may be ignored by a receiving node if, for example, it is not addressed to the particular receiver parsing the packet or if, for example, the packet is of a type not processed by the particular receiving node. If the packet is of an appropriate type and/or has an appropriate address for the receiving node to process, then the parsing elements of the receiving node permit the packet to be forwarded on to processing elements within the receiving node.

Similarly, transmission elements within the receiving node responsible for generation and transmission of packets to other nodes (for example in response to a received packet) need to determine parameters of transmitted packets required for a particular packet transmission. The transmission parameters may vary in accordance with the type of packet being transmitted and/or may vary in accordance with the type of received packet to which the transmission is responsive.

As communication protocol standards evolve, the parsing elements of the receiving node require updating to correctly recognize newly standardized packet types. Similarly, the transmission elements may need to generate different packets or may need to apply different sets of parameters to the transmission of packets. In current designs, such an update could require significant design changes in the parsing or transmission elements of the receiving node. These changes could involve significant electronic or software redesigns at significant cost and complexity to a manufacturer or user of such a communication system.

It is evident from the above discussion that a need exists for an improved method and apparatus for recognizing and generating packets in a packetized communication subsystem. In particular, a need exists for an improved method and apparatus which minimizes any redesigns required of a receiving node in response to changes in the implemented protocols of the communications system.

SUMMARY OF THE INVENTION

The present invention solves the above and other problems, thereby advancing the state of the useful arts, by providing a method and associated apparatus for programmable filtration and generation of information in a communication system. In particular, the present invention provides for a programmable recognition filter to determine which received packets are appropriately to be processed by the receiving node. The programmable filtration element comprises a table of entries and an associated table lookup element. Each entry in the table includes mask information and rules which, when applied to a received packet, determine whether the packet is recognized by the receiving node for further processing. In addition, each table entry may define actions to be taken in response to the recognition of a received packet. These actions, if provided, define for example automated response packets to be generated and transmitted in response to recognition of a received packet. A programmable packet generator comprises a register bank which defines the packet transmission parameters to be used for transmission of a packet. The parameters provide, for example, for automated repetitive transmission or transmission until a desired response is recognized, etc.

The present invention may be advantageously applied to a receiving node in a Fibre Channel communication system. Recognition of packets in a Fibre Channel communication system involves detecting the ordered set values accepted by the receiving node. The ordered set values are defined by the Fibre Channel protocol standards to be 32 bit values encoded into 40 bit values in accordance with methods commonly known as the 8b/10b encoding. Table entries used by the programmable filtration methods of the present invention as applied to the Fibre Channel communication standards include a mask field which may be applied to a received ordered set to determine if the ordered set is of interest to the receiving node. If the application of the mask determines that the ordered set is potentially of interest, then a sequence rule field is next applied to the received ordered set. The sequence rule field in each entry indicates, if set, that the corresponding ordered set must be received three times in sequence to be properly recognized and passed on for further processing in the receiving node. A fill action field in each entry, if set, indicates that upon proper recognition of the corresponding ordered set, a new pad/fill ordered set should be applied to the transmission portion of the receiving node.

As applied to a Fibre Channel communication system, a packet transmission parameter register file provided by the present invention defines parameters associated with the transmission of a packet. Such parameters include: 1) transmit packet once, 2) transmit packet three times, 3) transmit packet framed by other packets in accordance with rules of the Fibre Channel protocol, 4) transmit packet for a specified multiple of delay periods in a arbitrated loop topology, 5) transmit packet until a selected packet is received, and 6) transmit packet continuously (until stopped by reprogramming of the parameter register).

These methods and apparatus of the present invention permit rapid integration of changes in the underlying protocol of the receiving node by simply adding, deleting, or modifying entries in the programmable filtration table. New packet types or addresses required to be recognized by the receiving node due to enhancements or changes in the underlying protocol standards are simply added as entries in the programmable filtration table thereby obviating complex and costly design changes required by prior approaches. Similarly, fundamental parameters associated with the generation and transmission of packets may be altered by modifying appropriate fields in entries of the filtration table.

It is therefore an object of the present invention to provide methods and associated apparatus for programmably filtering packets received in a communication system.

It is a further object of the present invention to provide methods and associated apparatus for programmability in the generation of packets for transmission by a node in a communication system.

It is still a further object of the present invention to provide methods and associated apparatus for using a filtration table to recognize the valid reception of a packet in a node of a communication system.

It is yet another object of the present invention to provide methods and apparatus for using a filtration table having a mask field and rules to be applied to a received packet to recognize valid reception of a packet in a node of a communication system.

The above and other objects, aspects, features, and advantages of the present invention will become apparent from the following description and the attached drawing.

DETAILED DESCRIPTION OF THE INVENTION

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

It is known in the art to receive information in units called packets in a packetized communication system and to recognize valid information by analysis of a header portion of a received packet. Valid information so recognized is then passed to other elements in a receiving node for processing of the information content of the received packet. Invalid packets not recognized are ignored by the receiving node. Recognition of valid and invalid packets may include recognition of an address field indicative that the particular receiving node is to process the packet as well as recognition of particular types of packets which are to be processed by the receiving node. Both such recognition approaches involve analysis of the header portion of a received packet.

In particular, a Fibre Channel packetized communication system may recognize received transmissions by analysis of the received ordered set—a 32 bit word which defines the type of information transmitted. Ordered sets may indicate the start of further data transmissions, or may constitute a completed transmission in and of themselves.

Recognition of valid packets has been performed in the past by "hard-wired" logic (e.g. electronic circuits which are designed to recognize certain valid packets or by fixed parser programmed instructions in a data processing element). Such hard-wired logic is complex and costly to change as new packet types (ordered sets) are added to the protocol implemented by the receiving node. For example, if the underlying communication protocol implemented by the receiving node is changed the hard-wired logic must be redesigned at potentially significant cost to support the new features.

The present invention provides for flexibility in the update of the receiving node to recognize new types of packets (ordered sets). In particular, a filtration table structure of the present invention has one or more entries each of which define a type of packet and associated rules to be applied to recognize a packet type. A recognition filter element processes the filtration table entries responsive to receipt of a packet to determine if the received packet is recognized by the receiving node.

In addition, each entry of the filtration table defines actions to be initiated automatically in response to receipt of a particular recognized packet. Actions to be automatically initiated may include generation and transmission of a response packet, or starting or stopping of processing of particular packet types by modification of the filtration table entries. A programmable register file associated with the communication system receiving node allows for programming of parameters in the transmission of packets from the receiving node. Such transmission parameters may include, for example, controls related to the number of times a packet is transmitted.

Figure 1:
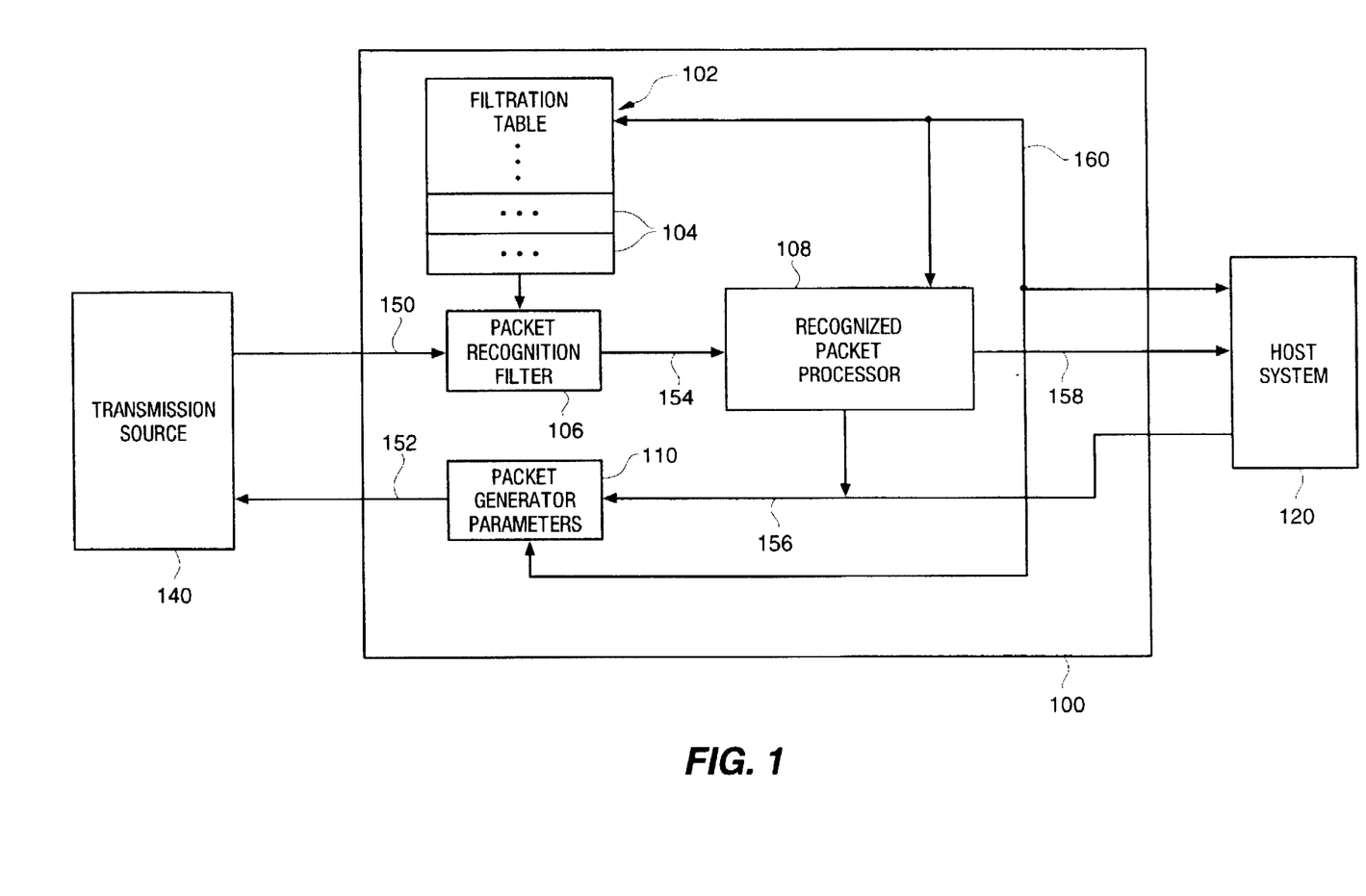
FIG. 1 is a block diagram depicting a receiving node in a communication system operable in accordance with the present invention.

FIG. 1 is a block diagram of a receiving node 100 operable in accordance with the present invention. Transmission source 140 sends packets to receiving node 100 over link 150 and receives replies (and other transmissions) from receiving node 100 over link 152. One of ordinary skill in the art will readily recognize that links 150 and 152 may be any physical link medium appropriate to the communication application. In Fibre Channel applications of the present invention, links 150 and 152 provide a connection between a device and the corresponding network topology (e.g. the fabric or an arbitrated loop). A packet received in receiving node 100 over link 150 is first applied to, and processed by, packet recognition filter 106 to determine if the packet is recognized by the receiving node 100 for further processing. Packets which are recognized by packet recognition filter 106 are applied over bus 154 to recognized packet processing element 108. Packets not wholly processed within receiving node 100 may then be applied over bus 158 to a host computer system 120 to complete further processing. Replies generated by processing of a received and recognized packet within recognized packet processor element 108 or host computer system 120 are applied via bus 156 to packet generator parameters 110. Packet generator parameters 110 then controls automated transmission aspects of applying the generated packet to link 152. For example, depending upon the parameters defined in the packet generator parameters 110, the packet may be applied once to link 152 or may be applied multiple times to link 152 with the termination conditions for such repetitive transmission being defined by the packet generator parameters 110.

Packet recognition filter 106 determines the validity of the received packets by applying various rules and masks defined by each entry 104 in a filtration table 102 stored in a memory (not shown) associated with the receiving node 100. The filtration table 102 may be easily altered to add, delete, or modify entries therein. Such simple alteration of the filtration table 102 enables extension or modification of the underlying communication protocol implemented by the receiving node 100. New packet types to be recognized by the receiving node require the simple addition of new entries 104 to the filtration table 102. Changes in underlying communication protocol require simple deletion or modification of entries to the entries 104 of the filtration table 102.

Control bus 160 permits recognized packet processor element 108 or host computer system 120 to manipulate entries in either filtration table 102 or packet generator parameters element 110. This control enables the recognition of valid packets to be modified by alteration of the contents of filtration table 102. In addition, parameters of packet generation and transmission may be modified as packets are generated in response to received packets.

Figure 2:
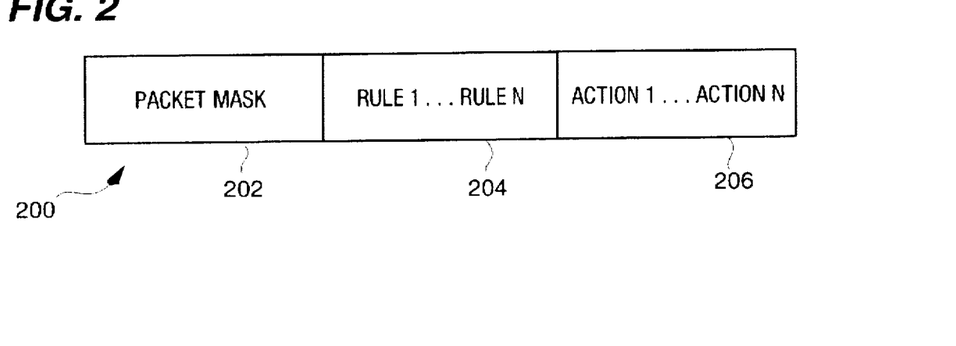
FIG. 2 is a diagram of a filtration table entry stored in the filtration table depicted in FIG. 1.

FIG. 2 depicts an exemplary entry 200 of the filtration table 102 of FIG. 1. Filtration table entry 200 is comprised of a number of fields defining the conditions required for recognizing a received packet and actions to be initiated automatically in response to recognition of a received packet. Packet mask 202 is a mask field which is applied to a portion of a received packet to determine if the packet is of interest to the receiving node. Packet mask 202 may include, for example, a bit field relevance mask which defines the relevant bits to be tested by the application of the mask and an expected value compared with the masked relevant bits. The packet header is bitwise AND'd with the relevance mask and that result is compared with the expected value. Depending upon the result of the comparison, the packet may not be of interest to the receiving node in accordance with the corresponding filtration table entry (other entries may then be similarly applied to recognize a received packet).

Field 204 represents a variable number of rules (denoted RULE1 ... RULEN in FIG. 2) which serve to further qualify recognition of a received packet. A packet which qualifies for recognition by application of the packet mask field 202 described above must also qualify for recognition by the further application of the rules field 204. The rules defined by rules field 204 are specific to the particular protocol implemented within receiving node 100 of FIG. 1. Actions field 206 represents a variable number of actions to be initiated automatically in response to recognition of a valid received packet by application of packet mask 202 and rules field 204 as described above. Exemplary of such automatic actions is the automatic generation and transmission of a reply packet responsive to receipt of a recognized packet.

Figure 3:
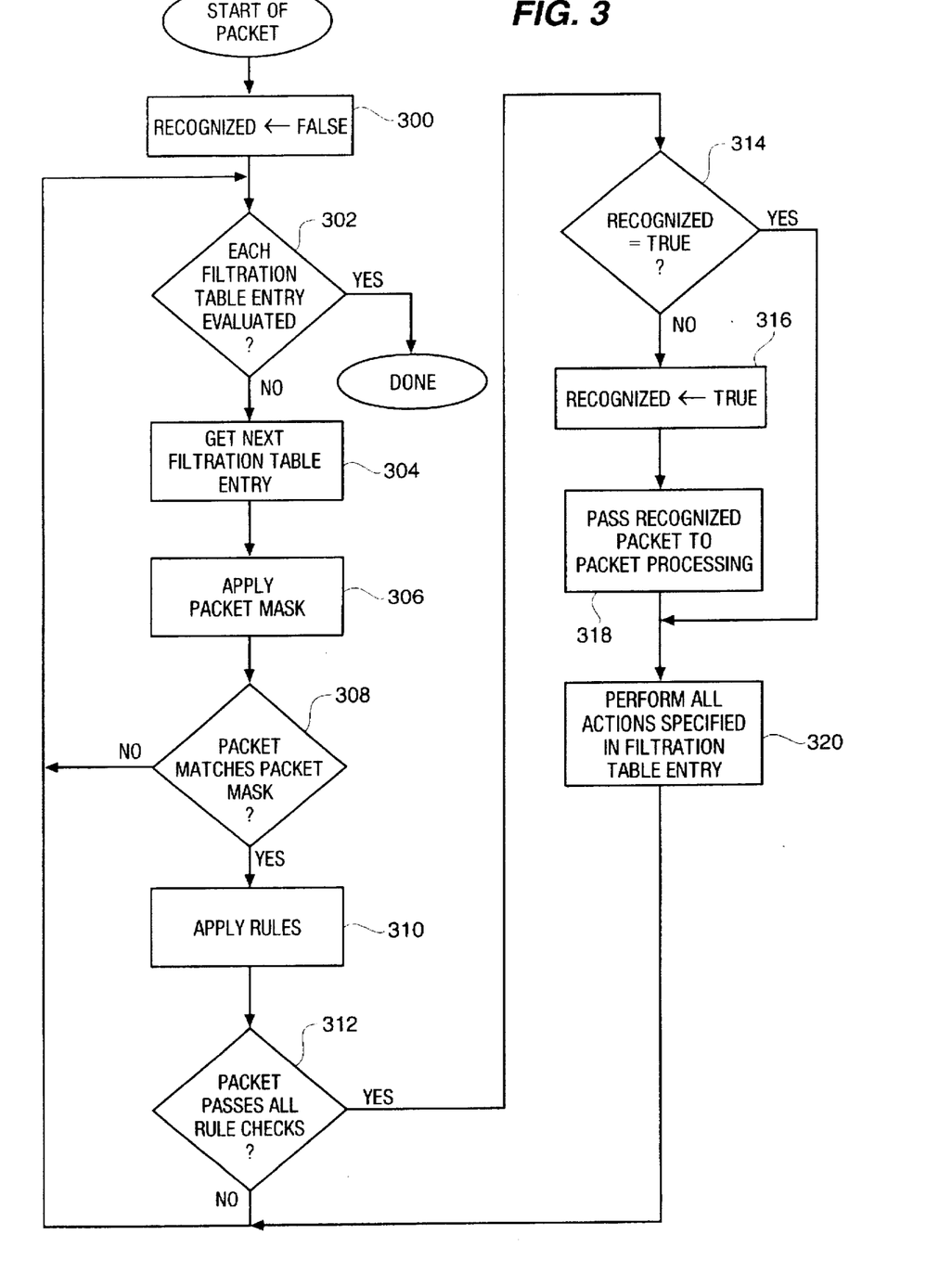
FIG. 3 is a flowchart describing the methods of the present invention operable in response to receipt of a packet to apply filtration table entries of FIG. 2 to permit recognition of packets in a receiving node.

FIG. 3 is a flowchart describing the methods of the present invention operable within packet recognition filter 106 of FIG. 1 to recognize valid received packets by use of the entries 200 of filtration table 102. Responsive to receipt of a packet (or a header portion of a packet), element 300 is first operable to initialize a local flag variable, RECOGNIZED, to indicate that the packet is not yet recognized by operation of the method. Elements 302-320 are then operable iteratively until each entry 200 in the filtration table 102 has been processed. Element 302 is operable to determine whether all entries 200 in the filtration table 102 have been processed by the remaining elements 304-320. If all entries 200 in filtration table 102 have been processed by elements 302-320, then processing of the packet by the packet recognition filter 106 is completed. Otherwise processing continues with element 304 to attempt recognition of the received packet.

Element 304 is operable to retrieve the next entry 200 from the filtration table 106. Element 306 is then operable to apply the packet mask field 202 of the next entry 200 to the received packet. Application of the packet mask field 202, as discussed above, may involve isolating the relevant bits from the header portion of the packet and then comparing the isolated, relevant bits to an expected value corresponding to the particular entry 200 being processed. Element 308 then determines whether the application of the packet mask field 202 results in a potentially recognized packet (i.e. the result of the comparison operations discussed above). If element 308 determines that the application of the packet mask 202 field of the current entry 200 being processed does not identify a potentially recognized packet, then processing continues by looping back to element 302 to process other entries 200 in the filtration table 102.

If the application of the packet mask field 202 of the current entry 200 identifies a potentially recognized packet, then element 310 and 312 are next operable to determine if the packet is in fact recognized according to the rules field 204 of the current entry 200. The rules field 204 defines a number of rules specific to the particular protocol implemented within receiving node 100 to further qualify a potentially recognized packet in the context of the protocol state. In effect, the rules in the rules field 204 define a state machine for determining the specific context in which a received packet may be recognized. As noted above, the filtration table 102 of the present invention may be easily modified to alter the protocol implemented by the receiving node 100 of FIG. 1. Such alterations may include dynamic redefinition of the mask and rules for recognition of packets based upon the reception of other earlier packets. In this manner, the entries of the filtration table 102 may implement a state machine for the dynamic recognition of packets based upon state information and context of the receiving node in the form of the present entries in the filtration table 102. In particular, element 310 applies the rules field 204 of the current entry 200 being processed. Element 312 is then operable to determine whether the application of the rules in the rules field 204 resulted in recognition of the received packet. If the application of the rules field 204 by operation of element 310 resulted in recognition of a valid packet, then processing continues with element 314 discussed below, otherwise processing continues by looping back to element 302 to evaluate other entries 200 in the filtration table 102.

If the packet mask 202 and rules field 204 of the current entry 200 being processed recognize the received packet, then element 314 is next operable to determine whether the packet was already recognized by application of the mask and rules of another entry 200 in the filtration table 102. Specifically, element 314 tests the local flag variable, RECOGNIZED to determine whether an earlier entry processed by elements 302-320 already recognized the packet as valid. If the packet was already recognized by processing of an earlier entry 200 in filtration table 102, then processing continues with element 320 discussed below. Otherwise, element 316 is operable to set the local flag variable RECOGNIZED to boolean TRUE to indicate that the received packet has now been recognized. Element 318 is then operable to pass the received packet on to the recognized packet processor element 108 of FIG. 1 to further process the received packet.

Element 320 is next operable to perform all actions defined by the actions field 206 of the current entry 200 of the filtration table 102. As noted above, the actions field 206 of the entry 200 defines actions to performed automatically in response to the recognition of a valid received packet.

Exemplary of such actions may be the automatic generation and transmission of a reply packet in response to the recognition of a valid received packet. Processing of the method of the present invention then continues by looping back to element 302 to process other entries in the filtration which may recognize the received packet. Although only one entry 200 in the filtration table 102 need recognize the received packet to permit the packet to be passed on to the recognized packet processor element 108 for further processing, each entry 200 in the filtration table is processed to assure performance of all automatic actions defined by the actions field of each entry which recognizes the received packet.

One of ordinary skill in the art will recognize many variations of the methods described above with respect to FIGS. 2 and 3. For example, the specific data structure used to represent fields in the various entries 200 as well as the data structures used to store entries 200 in filtration table 102 may be varied widely within the intended scope of protection of the present invention. One of ordinary skill will readily recognize many equivalent data structures and variations in the method to provide the same function and result, namely recognizing received packets while providing flexibility through the use of a modifiable filtration table structure.

Figure 4:
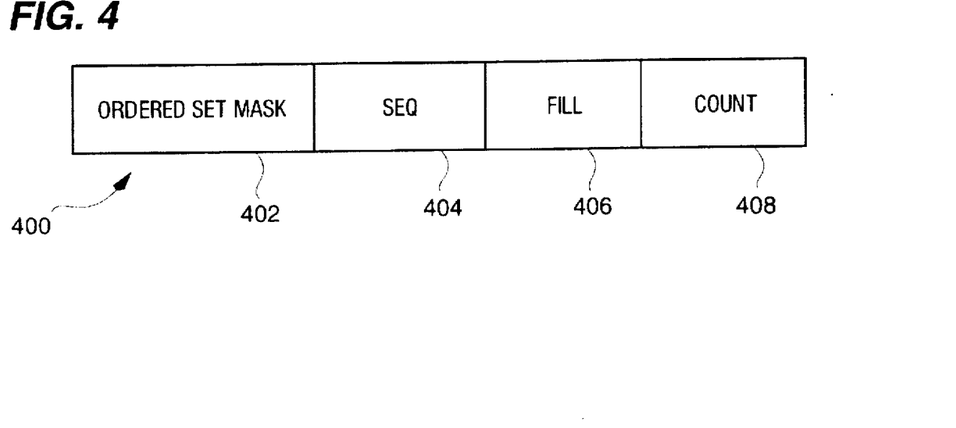
FIG. 4 is a diagram of a filtration table entry stored in the filtration table depicted in FIG. 1 as applied to Fibre Channel communication systems.
Figure 5:
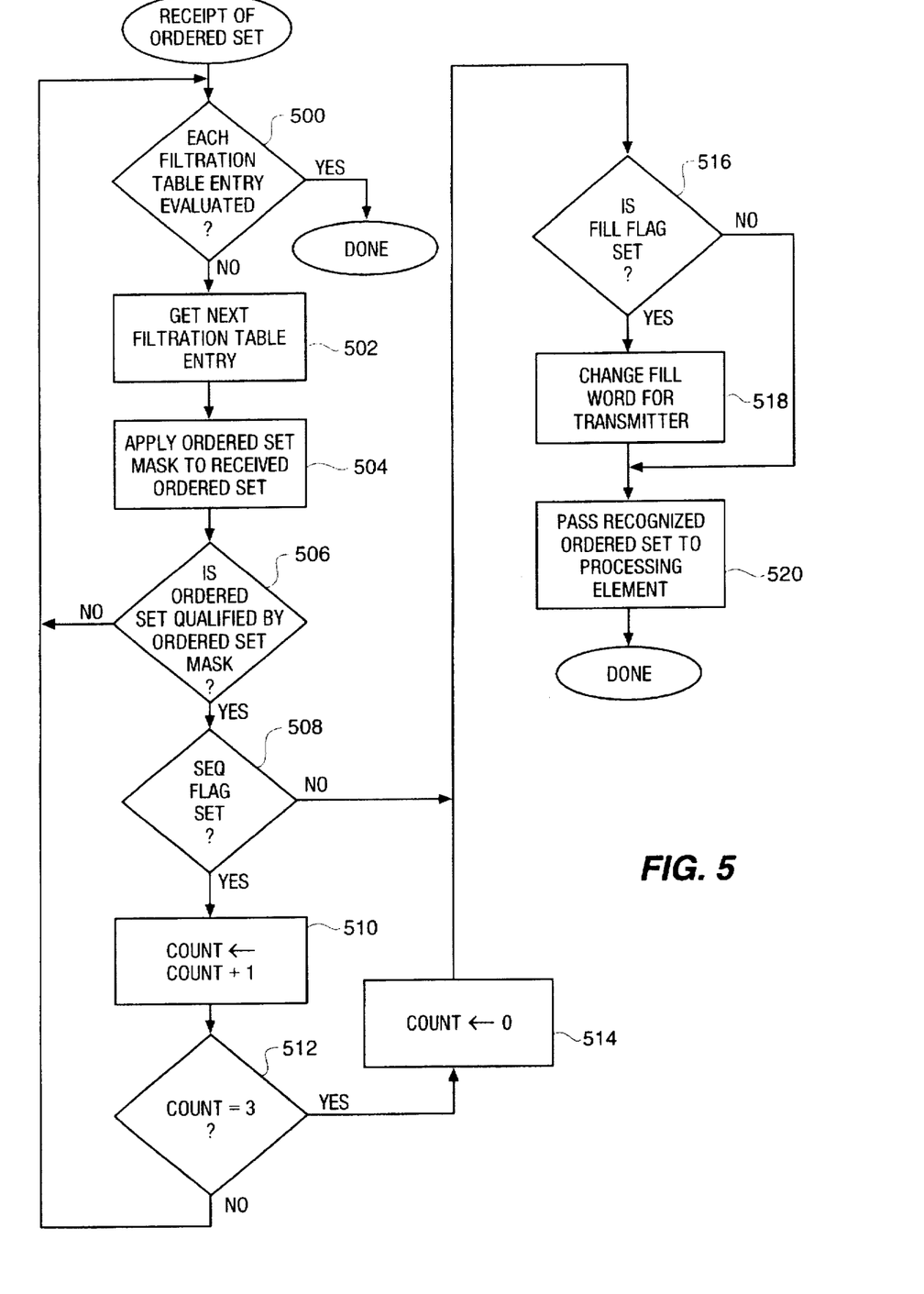
FIG. 5 is a flowchart describing the methods of the present invention operable in response to receipt of a Fibre Channel ordered set to apply filtration table entries of FIG. 4 to permit recognition of ordered sets in a Fibre Channel receiving node.

FIGS. 4 and 5 depict a variation of the structures and methods depicted and described by FIGS. 2 and 3 as applied to Fibre Channel communications. In standard Fibre Channel communication, information exchange is framed by 32 bit words called "ordered sets." Ordered sets provide control information pertaining to the Fibre Channel protocols operable over the link medium. Ordered sets are 32 bit values encoded into 40 bit values using the well known 8b/10b encoding methods. Valid values for Fibre Channel ordered sets are sparsely distributed through the range of possible values of the 32 bit word.

FIG. 4 depicts an exemplary structure of an entry 400 in a filtration table 102 of FIG. 1 adapted to represent information required to recognize valid ordered sets received from a Fibre Channel transmission node. Entry 400 is similar in overall structure to the more general structure depicted in FIG. 2. Ordered set mask field 402, like packet mask field 202, is used to determined that a received ordered set is potentially recognized depending upon the application of the protocol specific rules. As above, the ordered set mask field 402 may be implemented by a relevance bit mask to isolate relevant bits from the received ordered set. Also as above, an expected value is compared against the isolated relevant bits to recognize the received ordered set. The sequence field 404, similar to the rules field 204 described above, defines a Fibre Channel protocol specific rule for further qualifying the recognition of a received ordered set. Some ordered sets, as defined by the Fibre Channel specification, require that a particular ordered set be received three times in sequence to be properly recognized by the receiving node. If set, the sequence field 404 indicates that the ordered set potentially recognized by application of the ordered set mask field 402 must be received three times in sequence to be properly recognized by the Fibre Channel receiving node. The fill field 406, if set, indicates to the transmission portion a new ordered set value is to be used as the current fill word. Like actions field 206 of FIG. 2, the fill field 406 defines an action applicable to Fibre Channel applications to be automatically initiated in response to the recognition of the corresponding ordered set. Count field 408 is used as discussed below in conjunction with the sequence field 404 to count the number of sequential receptions of a potentially recognized ordered set. The count field is incremented responsive to each reception of a particular ordered set if the sequence field 404 flag is set. When the count field 408 reaches a value of three (for example), the ordered set is recognized as valid for further processing.

FIG. 5 is a flowchart describing the method of the present invention operable within packet recognition filter 106 of FIG. 1 to recognize valid ordered sets received from a Fibre Channel transmission source. The flowchart of FIG. 5 is similar to that of FIG. 3 but is adapted to process filtration table entries 400 as defined above to recognize valid ordered sets in a Fibre Channel receiving node. Element 500 is first operable in response to receipt of an ordered set to determine whether further entries 400 remain to be processed in the filtration table 102. If all entries 400 in the filtration table 102 have been evaluated and the received ordered set is not recognized, then the method of FIG. 5 is completed and the ordered set is not recognized as valid for further processing by the receiving node. If further entries 400 remain to be processed in the filtration table 102, then elements 500-512 are operable iteratively until all entries are processed or until an entry is encountered which recognizes the received ordered set as valid.

Element 502 is next operable to retrieve the next entry 400 in the filtration table 102. Element 504 is then operable to apply the ordered set mask field 402 to the received ordered set to determine whether the received ordered set is potentially recognizable by the receiving node as valid for further processing. As above, the application of the ordered set mask 402 may include the bitwise AND'ing and comparison of the ordered set to determine if relevant bits in the ordered set are set to expected values. Element 506 is then operable to determine if the application of the ordered set mask by operation of element 504 results in potential recognition of a valid ordered set. If the received ordered set is not recognized by application of the ordered set mask field 402, then processing continues by looping back to element 500 to process other entries 400 in the filtration table 102.

If elements 504 and 506 potentially recognize the received ordered set by application of the ordered set mask field 402, element 508 is then operable to determine if the sequence flag field 404 is set for the corresponding entry 400 in the filtration table 102. If the sequence flag field 404 is not set, processing continues with element 516, discussed below, to process the valid recognized ordered set. If the sequence flag field 404 is set, the element 510 is next operable to increment the count field 408 of the entry 400 being processed. If element 512 next determines that the received ordered set has not yet been received three times in sequence, then processing continues by looping back to element 500 to process other entries 400 in the filtration table 102. If the received ordered set has now been received three time as determine by element 512, then processing continues with element 514 operable to reset the count field 408 to zero in preparation for recognition of another ordered set.

Elements 516–520 are next operable in response to recognition of a valid received ordered set. In particular, element 516 is operable to determine whether the fill action flag field 406 is set in the entry 404 currently being processed. If the fill flag field 406 is set, then processing continues with element 518 to alter the fill ordered set value for the transmission portion. Processing then continues with element 520 to pass the valid, recognized ordered set on to the recognized packet processor element 108 of FIG. 1 for further processing of the recognized ordered set.

One of ordinary skill in the art will recognize many variations of the methods described above with respect to FIGS. 4 and 5. For example, the specific data structure used to represent fields in the various entries 400 as well as the data structures used to store entries 400 in filtration table 102 may be varied widely within the intended scope of protection of the present invention. One of ordinary skill will readily recognize many equivalent data structures and variations in the method to provide the same function and result, namely recognizing ordered sets received from a Fibre Channel transmission source while providing flexibility through the use of a modifiable filtration table structure.

Figure 6:
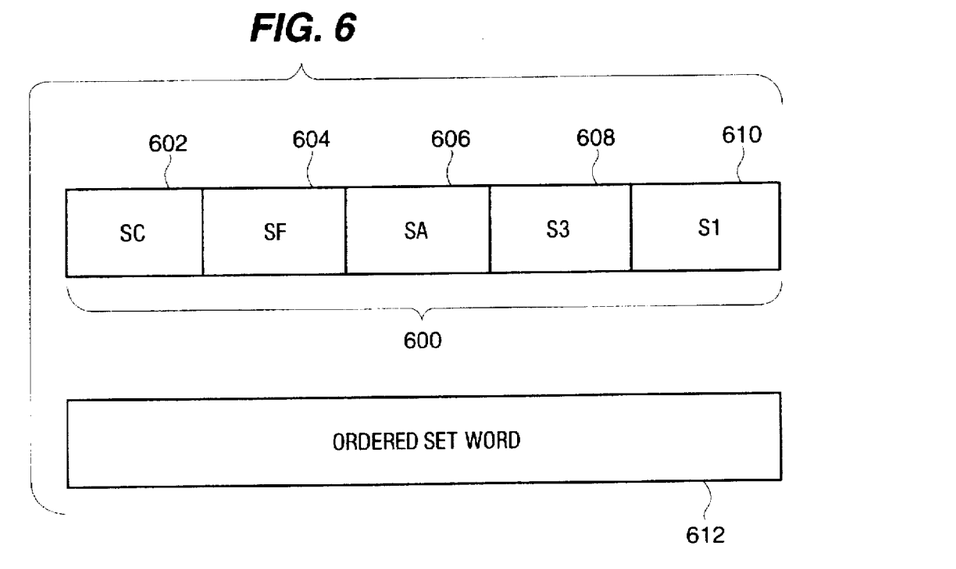
FIG. 6 depicts the transmission parameter bits useful in applying the present invention to a Fibre Channel communication system.

FIG. 6 depicts an exemplary register file shown as packet generator parameters 110 of FIG. 1. Ordered set word register 612 is programmed to the desired 32 bit ordered set data word by the generator of the ordered set (for example a host computer system 120 of FIG. 1 or the packet processor element 108 of FIG. 1). Parameter register 600 of FIG. 6 provides a plurality of programmable bits useful in a Fibre Channel communication node for automated control of the generation of ordered sets (or generation of other packets in other packetized communication systems). The SC bit field 602 of parameter register 600 indicates that the transmitter is to transmit the provided ordered set word (in register 612) continuously. The SF bit field 604 indicates that the provided ordered set word is to be transmitted continuously until the same ordered set word is received at the receiving node (unaltered) in a loop topology. The SA bit field 606 indicates that the provided ordered set word is to be transmitted once, and the operation completed when the transmitted word is received (unaltered) by the receiving node in a loop topology. The S3 bit field 608 and the S1 bit field 610 indicate, respectively, that the provided ordered set word be transmitted three times and one time. These parameter register 600 control bits are programmed by the generator of the ordered set word along with the ordered set word 612 register to control automated transmission of the desired ordered set word according to rules of the Fibre Channel protocol. One of ordinary skill in the art will readily recognize that the particular control bit fields are peculiar to the particular communication protocol implemented within the receiving node.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. An apparatus for recognition of received information in a receiving node of a communication system comprising:

a memory;

a filtration table stored in said memory having a plurality of entries, wherein at least one of said plurality of entries of said filtration table include at least one rule evaluated to recognize received information appropriate for further processing in said receiving node and wherein said at least one rule defines a state machine operable for determining the context to recognize said received information;

filter means, connected to said memory, for retrieving entries from said filtration table in response to receipt of said received information in said receiving node; and rule application means, cooperatively engaged with said filter means, for evaluating rules in the retrieved entries of said filtration table by operating the state machines defined by said rules to recognize said received information as appropriate for further processing in said receiving node.

2. The apparatus of claim 1 wherein said rules included in said entries of said filtration table include a mask field and wherein said rule application means includes:

means for applying said mask field to said received information to determine whether said received information is recognized as appropriate for further processing in said receiving node.

3. The apparatus of claim 2 wherein said rules included in said entries of said filtration table further includes an action field and wherein said rule application means includes:

means for applying said action field by performing an action defined by said action field responsive to recognition of said received information as appropriate for further processing in said receiving node.

4. The apparatus of claim 1 further comprising:

programmable transmission parameter means for storing parameters associated with the transmission of information from said receiving node; and generation means for automatically transmitting information from said receiving node in accordance with said parameters.

5. The apparatus of claim 1 wherein said entries in said filtration table include an action field defining a action to be taken and where said apparatus further comprises:

an action execution means, responsive to recognition of said received information as appropriate for further processing in said receiving node, to perform an action defined by said action field.

6. The apparatus of claim 5 further comprising:

programmable transmission parameter means for storing parameters associated with the transmission of information from said receiving node; and generation means for automatically transmitting information from said receiving node in accordance with said parameters.

7. The apparatus of claim 6 wherein said parameters includes a send once flag indicative of a requirement that generated information be transmitted once from said receiving node.

8. The apparatus of claim 6 wherein said parameters includes a send three times flag indicative of a requirement that generated information be transmitted three time in sequence from said receiving node.

9. The apparatus of claim 6 wherein said parameters includes a send continuously flag indicative of a requirement that generated information be transmitted continuously from said receiving node.

10. The apparatus of claim 6 wherein said parameters includes a send fill flag indicative of a requirement that generated information be transmitted continuously from said receiving node until the transmitted information is received by said receiving node.

11. The apparatus of claim 6 wherein said parameters includes a send around flag indicative of a requirement that generated information be transmitted once and indicative that further transmissions be delayed until the transmitted information from said receiving node is again received in said receiving node.

12. The apparatus of claim 1 wherein said communication system utilizes the Fibre Channel protocol and wherein said received information includes ordered sets.

13. The apparatus of claim 12 wherein said rules included in said entries of said filtration table include an ordered set mask field and wherein said rule application means includes:

means for applying said ordered set mask field to said ordered sets to determine whether said ordered sets are recognized as appropriate for further processing in said receiving node.

14. The apparatus of claim 13 wherein said rules included in said entries of said filtration table include a sequence flag and wherein said rule application means includes:

means, responsive to said sequence flag being set, for determining that said ordered set has been received a sufficient number of times in sequence to recognize the ordered set as appropriate for further processing in said receiving node.

15. An apparatus for recognition of received information in a receiving node of a communication system comprising:

a memory;

a filtration table stored in said memory, wherein entries of said filtration table include rules evaluated to recognize received information appropriate for further processing in said receiving node;

filter means, connected to said memory, for retrieving entries from said filtration table in response to receipt of said received information in said receiving node;

rule application means, cooperatively engaged with said filter means, for evaluating said rules in the retrieved entries of said filtration table to recognize said received information as appropriate for further processing in said receiving node;

programmable transmission parameter means for storing parameters associated with the transmission of information from said receiving node; and generation means for automatically transmitting information from said receiving node in accordance with said parameters.

16. The apparatus of claim 15 wherein said rules included in said entries of said filtration table include a mask field and wherein said rule application means includes:

means for applying said mask field to said received information to determine whether said received information is recognized as appropriate for further processing in said receiving node.

17. The apparatus of claim 16 wherein said rules included in said entries of said filtration table further includes an action field and wherein said rule application means includes:

means for applying said action field by performing an action defined by said action field responsive to recognition of said received information as appropriate for further processing in said receiving node.

18. The apparatus of claim 15 wherein said entries in said filtration table include an action field defining a action to be taken and where said apparatus further comprises:

action execution means, responsive to recognition of said received information as appropriate for further processing in said receiving node, to perform an action defined by said action field.

19. The apparatus of claim 18 further comprising:

programmable transmission parameter means for storing parameters associated with the transmission of information from said receiving node; and generation means for automatically transmitting information from said receiving node in accordance with said parameters.

20. The apparatus of claim 19 wherein said parameters includes a send once flag indicative of a requirement that generated information be transmitted once from said receiving node.

21. The apparatus of claim 19 wherein said parameters includes a send three times flag indicative of a requirement that generated information be transmitted three time in sequence from said receiving node.

22. The apparatus of claim 19 wherein said parameters includes a send continuously flag indicative of a requirement that generated information be transmitted continuously from said receiving node.

23. The apparatus of claim 19 wherein said parameters includes a send fill flag indicative of a requirement that generated information be transmitted continuously from said receiving node until the transmitted information is received by said receiving node.

24. The apparatus of claim 19 wherein said parameters includes a send around flag indicative of a requirement that generated information be transmitted once and indicative that further transmissions be delayed until the transmitted information from said receiving node is again received in said receiving node.

25. The apparatus of claim 15 wherein said communication system utilizes the Fibre Channel protocol and wherein said received information includes ordered sets.

26. The apparatus of claim 25 wherein said rules included in said entries of said filtration table include an ordered set mask field and wherein said rule application means includes:

means for applying said ordered set mask field to said ordered sets to determine whether said ordered sets are recognized as appropriate for further processing in said receiving node.

27. The apparatus of claim 26 wherein said rules included in said entries of said filtration table include a sequence flag and wherein said rule application means includes:

means, responsive to said sequence flag being set, for determining that said ordered set has been received a sufficient number of times in sequence to recognize the ordered set as appropriate for further processing in said receiving node.

* * * * *